United States Patent [19]

Metzger et al.

[11] Patent Number: 5,157,074
[45] Date of Patent: Oct. 20, 1992

[54] AQUEOUS COMPOSITIONS CONTAINING AN AT LEAST PARTIALLY BLOCKED POLYISOCYANATES AND A TRIMERIZATION CATALYST AND COATINGS AND BINDERS PREPARED THEREFROM

[75] Inventors: Sidney H. Metzger, Pittsburgh, Pa.; Robin E. Tirpak, Wheeling; James W. Rosthauser, Glendale, both of W. Va.

[73] Assignee: Miles Inc., Pittsburgh, Pa.

[21] Appl. No.: 734,384

[22] Filed: Jul. 23, 1991

[51] Int. Cl.$^5$ ................................................ C08L 75/04
[52] U.S. Cl. .................................... 524/589; 524/590; 524/591; 524/839; 427/389.8
[58] Field of Search ............... 524/589, 590, 591, 839; 427/389.8

[56] References Cited

U.S. PATENT DOCUMENTS 4,904,522  2/1990  Markusch ........................ 428/288

Primary Examiner—Maurice J. Welsh
Attorney, Agent, or Firm—Joseph C. Gil; Thomas W. Roy

[57] ABSTRACT

The present invention relates to an aqueous composition containing
  a) an at least partially blocked, aqueously dispersed polyisocyanate
    i) having an isocyanate content prior to blocking of at least 12% by weight, based on the weight of the unblocked polyisocyanate and
    ii) containing at least 2 equivalent percent, based on the total equivalents of isocyanate groups, of blocked isocyanate groups, and
  b) a trimerization catalyst.

The present invention also relates to coatings or binders prepared by heating the aqueous compositions to evaporate water and initiate trimerization.

24 Claims, No Drawings

AQUEOUS COMPOSITIONS CONTAINING AN AT LEAST PARTIALLY BLOCKED POLYISOCYANATES AND A TRIMERIZATION CATALYST AND COATINGS AND BINDERS PREPARED THEREFROM

BACKGROUND OF THE INVENTION

1. Field of the Invention

The present invention is directed to aqueous compositions containing an at least partially blocked, water dispersible polyisocyanate and a trimerization catalyst and to coatings or binders prepared by heating these compositions to evaporate water and initiate trimerization.

2. Description of the Prior Art

It is known from U.S. Pat. No. 4,904,522 to use aqueous dispersions of polyisocyanates as binders for fiberglass. When compared to known phenol/formaldehyde resins, the polyisocyanate binders cure at a much lower temperature, do not split off volatile monomers, provide at least the same strength, are not a potential formaldehyde source and do not require an amino alkoxy silane adhesion promoter. However, the polyisocyanate binders disclosed in this patent have relatively high quantities of unmodified monomeric diisocyanates. Because the presence of monomeric diisocyanates may lead to industrial hygiene problems, it would be beneficial to reduce the content of monomeric diisocyanates as much as possible.

Another deficiency of the polyisocyanate binders disclosed in U.S. Pat. No. 4,904,522 is that it is difficult to achieve complete cure during subsequent heating of the fiberglass mats in the oven zone. During the production of fiberglass mats, the fibers are treated with the aqueous polyisocyanate binders and continuously run through an oven zone in order to evaporate water and to cure the polyisocyanate resins.

When aqueously dispersed polyisocyanates are used as binders, the water serves as the co-reactant for the isocyanate groups to form polyureas. If the isocyanate content of the polyisocyanate binder is too high, water is evaporated in the oven zone before the reaction is complete and as a result, an uncured, unusable fiberglass mat is obtained.

A further disadvantage is that even though the preferred polyisocyanates of U.S. Pat. No. 4,904,522, i.e., polyphenyl polymethylene polyisocyanates, exhibit a low vapor pressure at ambient temperature, they still contain high amounts (as much as 70% by weight) of monomeric diphenyl methane diisocyanates. Upon exposure to the high temperatures in the oven zone these monomeric diisocyanates can be volatilized which results in high concentrations in the exhaust gases. This represents an environmental hazard if these exhaust gases escape into the atmosphere of the workplace or the air surrounding the manufacturing facility.

One method for lowering the isocyanate content of the polyisocyanate binders would be to react the polyisocyanates with polyols to form isocyanate-terminated prepolymers prior to dispersing in water. However, this results in products which have high viscosities at the desired low isocyanate content, i.e., an isocyanate content of less than 10% by weight, based on solids, and thus are too viscous to disperse in water even if they have been hydrophilically modified.

One method of avoiding uncured polyisocyanate binders is to incorporate catalysts which promote the isocyanate/water reaction in the aqueously dispersed polyisocyanate binders. However, this method also does not result in a complete cure of the polyisocyanate prior to evaporation of water in the oven zone.

Accordingly, it is an object of the present invention to provide aqueous binders which overcome the deficiencies of the previously described binders. It is an additional object to provide aqueous compositions which do not require water to cure, but which can be fully cured without giving off monomeric diisocyanates. It is an additional object of the present invention to provide aqueously dispersed binders that possess excellent adhesion, especially to glass fibers.

Surprisingly, these objects may be achieved in accordance with the present invention as described hereinafter.

SUMMARY OF THE INVENTION

The present invention relates to an aqueous composition containing an at least partially blocked, aqueously dispersed polyisocyanate having an isocyanate content of at least 12% by weight, based on the weight of the unblocked polyisocyanate, and a trimerization catalyst.

The present invention also relates to coatings or binders prepared by heating the aqueous compositions to evaporate water and initiate trimerization.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanato-3,3,5-trimethyl-5-isocyanatomethyl cyclohexane (isophorone diisocyanate), 2,4-and/or 2,6-hexahydrotoluylene diisocyanate, hexahydro-1,3-and/or -1,4-phenylene diisocyanate, perhydro-2,4'- and/or -4,4'-diphehylmethane diisocyanate, 1,3- and/or 1,4-phenylene diisocyanate, 2,4- and/or 2,6-toluylene diisocyanate, diphenylmethane-2,4'- and/or -4,4'-diisocyanate, naphthalene-1,5-diisocyanate, triphenylmethane-4,4', 4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, uretdione groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or preferably they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 8 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

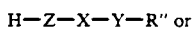

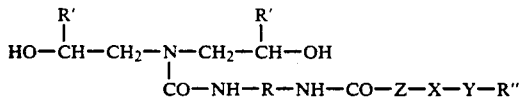

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably hydrogen or a methyl group, R" represents a monovalent hydrocarbon radical having from 1 to 12 carbon atoms, preferably an unsubstituted alkyl radical having from 1 to carbon atoms, X represents the radical obtained by removing the terminal oxygen atom from a polyalkylene oxide chain having from 5 to 90 chain members, preferably 20 to 70 chain members, wherein at least about 40%, preferably at about 65%, of the chain members comprise ethylene oxide units and the remainder comprises other alkylene oxide units such as propylene oxide, butylene oxide or styrene oxide units, preferably propylene oxide units, Y represents oxygen or —NR'''—wherein R''' has the same definition as R" and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

Either before, during or after the polyisocyanates have been dispersed in water, a trimerization catalyst is also incorporated into the aqueous compositions of the present invention. Trimerization catalysts which are suitable in accordance with the present invention include those previously known such as phosphines of the type described in DE-OS 1,935,763; alkali phenolates of the type described in GB-PS 1,391,066 or GB-PS 1,386,399; aziridine derivatives in combination with tertiary amines of the type described in U.S. Pat. No. 3,919,218; quaternary ammonium carboxylates of the type described in U.S. Pat. Nos. 4,454,317 and 4,801,663; quaternary ammonium phenolates with a zwitterionic structure of the type described in U.S. Pat. No. 4,335,219; ammonium phosphonates and phosphates of the type described in U.S. pat. No. 4,499,253; alkali carboxylates of the type described in E-OS 3,219,608; basic alkali metal salts complexed with acyclic organic compounds as described in U.S. Pat. No. 4,379,905 such as potassium acetate complexed with a polyethylene glycol which contains an average of 5 to 8 ethylene oxide units; basic alkali metal salts complexed with crown ethers as described in U.S. Pat. No. 4,487,928; aminosilyl group-containing compounds such as aminosilanes, diaminosilanes, silylureas and silazanes as described in U.S. Pat. No. 4,412,073; mixtures of alkali metal fluorides and quaternary ammonium or phosphonium salts as described in U.S. application Ser. No. 07/391,213; Mannich bases, for example, those based on i-nonylphenyl, formaldehyde and dimethylamine of the type described in U.S. Pat. Nos. 3,996,223 and 4,115,373; and quaternary ammonium hydroxides containing hydroxyalkyl substituents as described in U.S. Pat. No. 4,324,879.

One specific advantage of the present invention is that it is not necessary to form complexes of the highly active trimer catalysts because they are soluble in the aqueous media. Therefore, preferred trimerization catalysts for use in accordance with the present invention are basic alkali metal compounds whose aqueous solutions at a 1 molar concentration have a pH of at least 7.5. Preferred alkali metals are sodium and potassium, more preferably potassium. Suitable anions include carboxylates preferably having 1 to 12 carbon atoms, alcoholates preferably having 1 to 8 carbon atoms, phenolates preferably having 6 to 10 carbon atoms, carbonates, hydroxides, cyanates, enolates and cyanides. Examples of these anions include formates, acetates, propionates, 2-ethylhexanoates, n-dodecanoates, caprylates, methylates, ethylates, butylates, hexylates, phenolates, tert.-butyl-phenolates, carbonates, hydroxides, cyanates, thiocyanates, cyanides and N-methylacetamides. Included among the preferred anions are carboxylates, alcoholates, phenolates, carbonates, hydroxides, cyanates and cyanides. More preferred anions are the hydroxides and carboxylates having 1 to 4 carbon atoms.

Especially preferred trimerization catalysts are potassium acetate and potassium hydroxide.

Because certain of the trimerization catalysts also promote the reaction between isocyanate groups and water, a portion of the isocyanate groups are blocked with a monofunctional blocking agent to prevent these groups from reacting with water. In addition, the reaction between isocyanate groups and water gives off carbon dioxide which can cause the aqueous compositions to foam. If it is desired to cure the aqueous compositions before the foam has dissipated, then in those instances when the foam may cause subsequent processing problems it is also recommended to block at least a portion of the isocyanate groups. Finally, if increased storage stability is required, it may be necessary to block a portion of the isocyanate groups to ensure that isocyanate groups can be regenerated for the trimerization reaction which takes place when the aqueous composition is cured.

Suitable monofunctional blocking agents are those which are more reactive with isocyanate groups than water. Examples of suitable blocking agents include secondary aromatic amines such as N-methylaniline; the N-methyl toluidines, N-phenyl toluidine and N-phenyl xylidene; N-alkyl amides such as N-methyl acetamide; imides such as succinimide; lactams such as $\epsilon$-caprolactam and $\delta$-valerolactam; mercaptans such as methylmercaptan, ethyl mercaptan, butyl mercaptan, 2-mercapto-benzothiazole and dodecyl mercaptan; triazoles such as 1H-1,2,4-triazole; preferably alkali metal bisulfites and more preferably oximes.

The oximes preferably correspond to the formula $$HO-N=C(R_1)(R_2)$$

wherein $R_1$ and $R_2$ may be the same or different and represent hydrogen or an alkyl or aralkyl group having 1 to 10 carbon atoms, provided that both $R_1$ and $R_2$ are not hydrogen, or the two groups together with the oxime carbon atom may form a cycloaliphatic ring containing 4 to 8 carbon atoms.

Suitable oxime blocking agents include methyl ethyl ketoxime, methyl isobutyl ketoxime, acetone oxime, cyclohexanone oxime and methyl n-amyl ketoxime, methyl n-propyl ketoxime, methyl isopropyl ketoxime, diethyl ketoxime, methyl sec-butyl ketoxime, ethyl butyl ketoxime and acetophenone oxime.

The equivalent ratio of monofunctional blocking groups to isocyanate groups is at least 0.02:1, preferably at least 0.25:1, more preferably at least 0.6:1 and most preferably about 1:1. With regard to the latter ratio if an excess of the blocking agent is used, the excess may be removed after the blocking reaction is complete. However, to avoid the necessity of removing excess blocking agent, it is preferred not to use an excess of the blocking agent.

During subsequent curing of the aqueous composition at elevated temperature the blocking agent will be released and the reformed isocyanate groups will be available for trimerization. Any isocyanate groups which are not blocked by the blocking agent may be left to react with water. If the aqueous composition will be cured shortly after its preparation, the unblocked isocyanate groups will take part in the trimerization reaction. Any isocyanate groups which react with water to form urea groups will not be available for trimerization.

In accordance with another, less preferred embodiment of the present invention, a portion of the isocyanate groups of the dispersed polyisocyanate may also be reacted with compounds having at least two isocyanate-reactive groups, preferably groups which are more reactive with isocyanate groups than water. Examples of these compounds are the polyamines having a molecular weight of less than 400 and containing two or more primary and/or secondary amino groups which are disclosed in copending application, U.S. application Ser. No. 07/677,010, filed Mar. 28, 1991, the disclosure of which is herein incorporated by reference; and the primary or secondary monoamines containing at least one hydroxyl group disclosed in copending application, U.S. application Ser. No. 07/529,056, filed May 25, 1990, the disclosure of which is herein incorporated by reference; or mixtures of these compounds as disclosed in copending application, U.S. application Ser. No. 07/676,670, filed Mar. 28, 1991, the disclosure of which is herein incorporated by reference.

It is also possible in accordance with the present invention to add compounds which are not more reactive with isocyanate groups than water, such as polyhydroxyl compounds, to the aqueous compositions. Suitable polyhydroxyl compounds are disclosed in copending applications, U.S. application Ser. No. 07/676,670 filed Mar. 28, 1991, the disclosures of which are herein incorporated by reference. If polyhydroxyl compounds are added and the aqueous composition is cured shortly after its preparation, then the reaction between the hydroxyl groups and isocyanate groups will not be complete. In this case the hydroxyl groups will react with a portion of the isocyanate groups during the subsequent trimerization reaction.

The amount of the these isocyanate-reactive compounds is chosen to provide an equivalent ratio of isocyanate-reactive groups to isocyanate groups of the dispersed polyisocyanate of less than 0.4:1.0, preferably less than 0.2:1.0 and more preferably less than 0.1:1.0. Lower limits for the amount of these compounds are chosen to provide an equivalent ratio of isocyanate-reactive groups which are more reactive than water to isocyanate groups of 0.02:1.0, preferably 0.05:1.0.

It is believed that amino groups react with the isocyanate groups on the surface of the dispersed polyisocyanates to form urea groups which encapsulate the dispersed polyisocyanates. Because this encapsulation may interfere with the reaction between the isocyanate groups and the blocking agent, it is preferred not to add significant amounts of the polyamines for reaction with the dispersed polyisocyanate. If the incorporation of urea groups is desired, it is possible to react the polyamines with the polyisocyanate before the polyisocyanate is dispersed in water as previously described.

The trimerization catalyst, the blocking agent and the optional isocyanate-reactive compound may be added to the water either before, during or after the polyisocyanate has been dispersed. Preferably, the polyisocyanate is first dispersed in water and then the trimerization catalyst, blocking agent and optional isocyanate-reactive compound are added to the dispersed polyisocyanate. In one embodiment of the present invention the polyisocyanate may be dispersed in water in a first mixing step, and subsequently the remaining components can be added to this mixture in a second mixing step. Suitable apparatus for performing these mixing steps have previously been disclosed for dispersing the polyisocyanate in water and also include the mixing apparatus disclosed in copending application, U.S. application Ser. No. 07/677,002, filed Mar. 28, 1991, the disclosure of which is herein incorporated by reference.

In accordance with the present invention, it is also possible to incorporate additives into the aqueous compositions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous compositions prepared in accordance with the present invention may be used alone, e.g., as binders for fiberglass, or they may be used as crosslinkers for aqueously dispersed polyurethanes which may optionally contain hydroxyl and/or amino groups. The dispersions according to the present invention are also suitable to improve the properties (such as adhesion, solvent resistance and abrasion resistance) of many other aqueous polymer dispersions such as acrylic, epoxy, polyvinyl acetate and styrene/butadiene rubber dispersions.

The invention is further illustrated but is not intended to be limited by the following examples in which all parts and percentages are by weight unless otherwise specified.

EXAMPLES

EXAMPLE 1

Preparation of an aromatic water-dispersible polyisocyanate

A three liter round bottom flask equipped with a thermometer, drying tube, condenser, and stirrer was charged with 549 parts of Crude MDI[1] and 274.5 parts of a monofunctional poly(ethylene oxide) ether[2]. The temperature of the reaction flask was increased to 70°. The reaction preceeded at this temperature for four hours at which time the isocyanate content was determined by titration to be 20.42% (theoretical NCO=20.75%). The modified polyisocyanate was cooled to ambient temperature and placed in dry containers.

1 An aniline/formaldehyde condensation product containing 4,4'-diphenylmethane diisocyanate and about 50% of higher functionality homologs and having an isocyanate content of about 31.5% and a viscosity at 25° C. of 200 mPa.s.

2 A polyether monohydric alcohol having a molecular weight of 2200 and prepared from n-butanol, ethylene oxide and propylene oxide (molar ratio of ethylene oxide to propylene oxide - 83:17).

EXAMPLE 2

Trimerization of a partially blocked (75%), aqueous, aromatic olyisocyanate with potassium acetate catalyst 125 grams of the water dispersible polyisocyanate of Example 1 were dispersed in a two liter resin flask containing 192.53 grams of demineralized water at ambient temperature and under agitation. To the dispersed polyisocyanate was added a mixture of butanone oxime (MEKO, 39.62 grams) and potassium acetate (1.25 grams of a 1% aqueous solution). The result was a thin, off-white dispersion. After 3 days the dispersion was stable, and still contained traces of free isocyanate. The films (3 and 10 mils wet, oven cured at 150° C. for 45 minutes) from this dispersion were clear, yellow and not continuous. IR analysis of these films showed both trimer and urea.

EXAMPLE 3

(Comparison) Trimerization of an aqueous, aromatic polyisocyanate with potassium hydroxide catalyst 125 grams of the water dispersible polyisocyanate of Example 1 were dispersed in a two liter resin flask containing 232.14 grams of demineralized water at ambient temperature and under agitation. To the dispersed polyisocyanate was added potassium hydroxide (1.25 grams of a 1% aqueous solution). The off-white dispersion foamed badly, had a viscosity of 700 mPa.s at 25° C. and a pH of 3.4. A film (5 mils wet, cured at 150° C. for 45 minutes) was clear, yellow and continuous. It had a pencil hardness of 2 H, adhesion by tape test of 5 B, MEK double rub of >200, and was not sensitive to the water-spot test.

EXAMPLE 4

Trimerization of a partially blocked (75%), aqueous, aromatic polyisocyanate with potassium hydroxide catalyst 125 grams of the water dispersible polyisocyanate of Example 1 were dispersed in a two liter resin flask containing 192.53 grams of demineralized water at ambient temperature and under agitation. To the dispersed polyisocyanate was added a mixture of butanone oxime (MEKO, 39.62 grams) and potassium hydroxide (1.25 grams of a 1% aqueous solution). The reaction exothermed to 40° C. and foamed less severely than the comparative example due to the fact that a portion of the isocyanate groups were blocked. The dispersion had a viscosity of 1500 mPa.s at 35° C. and a pH of 3.2. A film (10 mils wet, cured at 150° C. for 45 minutes) from this dispersion was clear, yellow and continuous. It had a pencil hardness of 2 H, adhesion by tape test of 5 B, MEK double rub of >200, and was not sensitive to the water-spot test.

EXAMPLE 5

Trimerization of a blocked (100%), aqueous, aromatic polyisocyanate with potassium hydroxide catalyst 125 grams of the water dispersible polyisocyanate of Example 1 were dispersed in a two liter resin flask containing 178.08 grams of demineralized water, 52.82 grams of butanone oxime, 1.25 grams of a 1% aqueous solution of potassium hydroxide and 0.20 grams of a silicone containing flow agent (SILWET L-77, available from Union Carbide) at ambient temperature and under agitation. The reaction exothermed to 38° C. and did not foam. The off-white dispersion had a viscosity of 280 mPa.s at 25° C. and a pH of 4.75. A film (5 mils wet, cured at 150° C. for 45 minutes) from the dispersion was clear, yellow and continuous. It had a pencil hardness of 2 H, adhesion by tape test of 5 B, MEK double rub of >200, and was not sensitive to the water-spot test. IR analysis of the film showed both timer and urea formation.

Film testing procedures:
Pencil Hardness - ASTM D3363
Adhesion to Tape Test- ASTM D3359-83
MEK Double Rubs - Number of double rubs with a cotton cheese cloth saturated with MEK that were necessary to begin to remove the coating from the glass plate. Water Spot Sensitivity - One drop of water was placed on the coating for one hour, then the film was checked to see if the water had any effect. If the film had a haze or was easier to re-move from the glass where the water was, it would be considered sensitive.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous composition containing
  a) an at least partially blocked, aqueously dispersed polyisocyanate
    i) having an isocyanate content prior to blocking of at least 12% by weight, based on the weight of the unblocked polyisocyanate and
    ii) containing at least 2 equivalent percent, based on the total equivalents of isocyanate groups, of blocked isocyanate groups, and
  b) a trimerization catalyst.

2. The composition of claim 1 wherein said monofunctional blocking agent comprises an oxime which corresponds to the formula

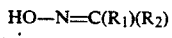

wherein
$R_1$ and $R_2$ may be the same or different and represent hydrogen or an alkyl or aralkyl group having 1 to 10 carbon atoms, provided that both $R_1$ and $R_2$ are not hydrogen, or the two groups together with the oxime carbon atom may form a cycloaliphatic ring containing 4 to 8 carbon atoms.

3. The composition of claim 1 wherein said polyisocyanate is rendered hydrophilic by reaction with a compound containing a lateral or terminal nonionic hydrophilic group.

4. The composition of claim 1 wherein said polyisocyanate contains at least 60 equivalent percent, based on the total equivalents of isocyanate groups, of blocked isocyanate groups.

5. The composition of claim 2 wherein said polyisocyanate contains at least 60 equivalent percent, based on the total equivalents of isocyanate groups, of blocked isocyanate groups.

6. The composition of claim 3 wherein said polyisocyanate contains at least 60 equivalent percent, based on the total equivalents of isocyanate groups, of blocked isocyanate groups.

7. An aqueous composition containing
  a) an at least partially blocked, aqueously dispersed polyisocyanate
    i) having an isocyanate content prior to blocking of at least 12% by weight, based on the weight of the unblocked polyisocyanate and
    ii) containing at least 2 equivalent percent, based on the total equivalents of isocyanate groups, of blocked isocyanate groups, and
  b) a trimerization catalyst comprising a member selected from the group consisting alkali metal carboxylates and alkali metal hydroxides.

8. The composition of claim 7 wherein said monofunctional blocking agent comprises an oxime which corresponds to the formula

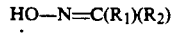

wherein
$R_1$ and $R_2$ may be the same or different and represent hydrogen or an alkyl or aralkyl group having 1 to 10 carbon atoms, provided that both $R_1$ and $R_2$ are not hydrogen, or the two groups together with the oxime carbon atom may form a cycloaliphatic ring containing 4 to 8 carbon atoms.

9. The composition of claim 7 wherein said polyisocyanate is rendered hydrophilic by reaction with a compound containing a lateral or terminal nonionic hydrophilic group.

10. The composition of claim 7 wherein said polyisocyanate contains at least 60 equivalent percent, based on the total equivalents of isocyanate groups, of blocked isocyanate groups.

11. The composition of claim 8 wherein said polyisocyanate contains at least 60 equivalent percent, based on the total equivalents of isocyanate groups, of blocked isocyanate groups.

12. The composition of claim 9 wherein said polyisocyanate contains at least 60 equivalent percent, based on the total equivalents of isocyanate groups, of blocked isocyanate groups.

13. A process for the preparation of a fiberglass mat which comprises treating fiberglass with an aqueous composition containing
a) an at least partially blocked, aqueously dispersed polyisocyanate
   i) having an isocyanate content prior to blocking of at least 12% by weight, based on the weight of the unblocked polyisocyanate and
   ii) containing at least 2 equivalent percent, based on the total equivalents of isocyanate groups, of blocked isocyanate groups, and
b) a trimerization catalyst.

14. The process of claim 13 wherein said monofunctional blocking agent comprises an oxime which corresponds to the formula $$HO-N=C(R_1)(R_2)$$

wherein
R$_1$ and R$_2$ may be the same or different and represent hydrogen or an alkyl or aralkyl group having 1 to 10 carbon atoms, provided that both R$_1$ and R$_2$ are not hydrogen, or the two groups together with the oxime carbon atom may form a cycloaliphatic ring containing 4 to 8 carbon atoms.

15. The process of claim 13 wherein said polyisocyanate is rendered hydrophilic by reaction with a compound containing a lateral or terminal nonionic hydrophilic group.

16. The process of claim 13 wherein said polyisocyanate contains at least 60 equivalent percent, based on the total equivalents of isocyanate groups, of blocked isocyanate groups.

17. The process of claim 14 wherein said polyisocyanate contains at least 60 equivalent percent, based on the total equivalents of isocyanate groups, of blocked isocyanate groups.

18. The process of claim 15 wherein said polyisocyanate contains at least 60 equivalent percent, based on the total equivalents of isocyanate groups, of blocked isocyanate groups.

19. A process for the preparation of a fiberglass mat which comprises treating fiberglass with an aqueous composition containing
a) an at least partially blocked, aqueously dispersed polyisocyanate
   i) having an isocyanate content prior to blocking of at least 12% by weight, based on the weight of the unblocked polyisocyanate and
   ii) containing at least 2 equivalent percent, based on the total equivalents of isocyanate groups, of blocked isocyanate groups, and
b) a trimerization catalyst comprising a member selected from the group consisting alkali metal carboxylates and alkali metal hydroxides.

20. The process of claim 19 wherein said monofunctional blocking agent comprises an oxime which corresponds to the formula $$HO-N=C(R_1)(R_2)$$

wherein
R$_1$ and R$_2$ may be the same or different and represent hydrogen or an alkyl or aralkyl group having 1 to 10 carbon atoms, provided that both R$_1$ and R$_2$ are not hydrogen, or the two groups together with the oxime carbon atom may form a cycloaliphatic ring containing 4 to 8 carbon atoms.

21. The process of claim 19 wherein said polyisocyanate is rendered hydrophilic by reaction with a compound containing a lateral or terminal nonionic hydrophilic group.

22. The process of claim 19 wherein said polyisocyanate contains at least 60 equivalent percent, based on the total equivalents of isocyanate groups, of blocked isocyanate groups.

23. The process of claim 20 wherein said polyisocyanate contains at least 60 equivalent percent, based on the total equivalents of isocyanate groups, of blocked isocyanate groups.

24. The process of claim 21 wherein said polyisocyanate contains at least 60 equivalent percent, based on the total equivalents of isocyanate groups, of blocked isocyanate groups.

* * * * *